(No Model.)

J. J. KELLY.
CAR AXLE.

No. 347,353. Patented Aug. 17, 1886.

Witnesses:
Wm Mayer
Joseph E. Ford

Inventor:
John J. Kelly
By John M. Smith
Atty.

UNITED STATES PATENT OFFICE.

JOHN J. KELLY, OF SAN FRANCISCO, CALIFORNIA, ASSIGNOR OF THREE-FOURTHS TO LORENZO D. LATIMER, WILLIAM W. MORROW, AND RICHARD LAMBERT, OF SAME PLACE.

CAR-AXLE.

SPECIFICATION forming part of Letters Patent No. 347,353, dated August 17, 1886.

Application filed November 5, 1885. Serial No. 181,971. (No model.)

*To all whom it may concern:*

Be it known that I, JOHN J. KELLY, a citizen of the United States, residing at San Francisco, in the county of San Francisco and State of California, have invented a new and useful Divided Car-Axle, of which the following is a specification.

My invention consists in constructing a railroad-car axle in two separate parts, connected by a housing or coupling with outwardly-extending sleeves in such a manner that one part of the axle with its wheel may rotate independently of the other.

The object of my invention is to provide a means whereby the friction so incident upon the railway car or carriage wheels in turning curves upon their tracks or permanent ways is greatly lessened and the wheels caused to pass over their tracks without sliding, binding, or impinging to any considerable extent against the rails. I accomplish this object by the means illustrated in the accompanying drawings, forming a part of this specification, in which—

Figure 1:
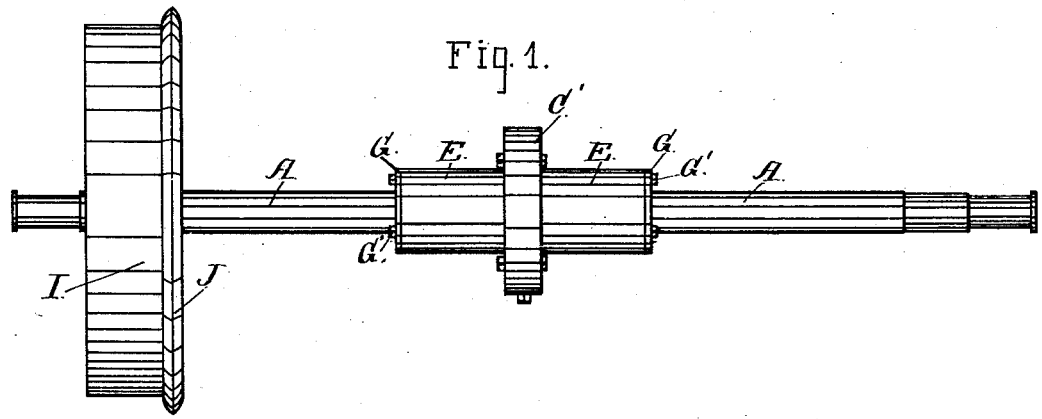
Figures 2, 3:
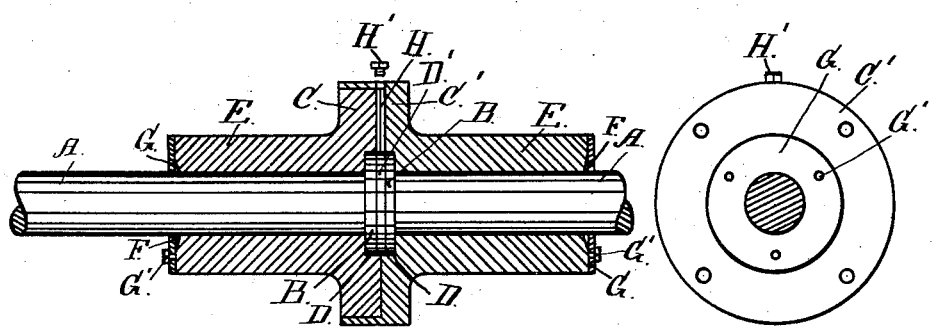

Figure 1 is a view in elevation of my divided car-axle with one car-wheel in position. Fig. 2 is a longitudinal section. Fig. 3 is an outer end view of one-half of the coupling.

A represents a car-axle divided centrally, with the two inner ends provided with collars B, which latter in practice may be shrunk upon the ends of the axles. The two ends of the divided axle are connected by means of a housing or coupling, C C', in the inner faces of which is made an annular rabbet or ledge, D, which receives the collar B in which they operate. These collars are not flush with the faces of the coupling, but a sufficient space is provided in each rabbet when the collars are in position to receive a metal washer or disk, D', and when the parts are united by the two parts of the coupling one half of the metal washer will be contained and held in position in the rabbet upon one side of the coupling, and the other half in the rabbet in the opposite coupling, and thus prevent all lateral movement of the washer or packing, and the faces of the two collars will abut against the metal washer, and thereby prevent end movement or impact of the collars or abutting ends of the axle.

From the outer face of each half of the coupling or housing extends a sleeve, E, within the end of which is formed a stuffing-box, F, by means of a circumferential groove in the end of the sleeves, over which is placed the cap G, held by the nuts and bolts G'. By this means that portion of the divided axle that is housed is rendered dust-proof.

In connecting the two parts of the housing or coupling the part C fits into the socket upon the part C', in which position the two parts are united by the bolts and nuts shown by a close and strong union of the parts. It is evident, however, that the parts may be united by a screw-cap in place of the bolts and nuts.

The parts are lubricated by means of a cup or oil-passage, H, in which the lubricant is placed. This cup or passage is rendered oil-tight by the set-screw H'.

The tires I of my car-wheels are preferably made flat on a horizontal plane from their junctures with the flange J, instead of rounding from the flange outwardly, as in the ordinary construction of car-wheel tires.

I am aware that a divided car-axle is old, and that a divided car-axle joined by a divided coupling with a stuffing-box at each end is not new, and further that a divided car-axle with its opposing ends enlarged and with a ball-and-socket joint between such opposing ends has been used, and therefore do not broadly claim such features; but,

Having thus described my invention, what I claim, and desire to secure by Letters Patent, is—

1. The combination of the divided axle A, provided with end collars B, the interposed flat annular washer or packing D', and the divided coupling C C', with recesses at the center to embrace and hold both the collars and the washer or packing, substantially as and for the purposes set forth.

2. The combination of the divided car-axle A, provided with end collars B B, a flat annular washer or packing, D', placed between said collars, and the divided coupling C C', provided with recesses D at the center to embrace and hold both the collars and the washer or packing, a stuffing-box, F, at each end, and an oil-passage, H, at the center, substantially as and for the purposes set forth.

In testimony that I claim the foregoing I have hereunto set my hand and seal.

JOHN J. KELLY. [L. S.]

Witnesses:
C. W. M. SMITH,
CHAS. E. KELLY.